US008740216B2

(12) United States Patent
Ota et al.

(10) Patent No.: US 8,740,216 B2
(45) Date of Patent: Jun. 3, 2014

(54) DOCUMENT CONVEYING APPARATUS AND DOCUMENT CONVEYING METHOD

(75) Inventors: Naoto Ota, Shizuoka (JP); Yoshio Idogawa, Tokyo (JP)

(73) Assignees: NEC AccessTechnica, Ltd., Shizuoka (JP); NEC Engineering, Ltd., Tokyo (JP)

( * ) Notice: Subject to any disclaimer, the term of this patent is extended or adjusted under 35 U.S.C. 154(b) by 0 days.

(21) Appl. No.: 13/534,931

(22) Filed: Jun. 27, 2012

(65) Prior Publication Data

US 2013/0001864 A1    Jan. 3, 2013

(30) Foreign Application Priority Data

Jun. 28, 2011   (JP) ................................ 2011-142498

(51) Int. Cl.
*B65H 29/20* (2006.01)

(52) U.S. Cl.
USPC ......................................... 271/314; 399/374

(58) Field of Classification Search
USPC ........................ 399/374; 271/314, 273–274
See application file for complete search history.

(56) References Cited

U.S. PATENT DOCUMENTS

| | | | |
|---|---|---|---|
| 5,887,865 A * | 3/1999 | Ishimaru ........................ | 399/374 |
| 6,393,251 B2 * | 5/2002 | Kono ............................. | 399/374 |
| 7,080,836 B2 * | 7/2006 | Hamada et al. ................ | 271/274 |
| 7,530,568 B2 * | 5/2009 | Uchida et al. .................. | 271/273 |
| 7,717,423 B2 * | 5/2010 | Litman et al. .................. | 271/273 |
| 8,387,979 B2 * | 3/2013 | Nagura et al. ................. | 271/274 |
| 2003/0227654 A1 * | 12/2003 | Shiraishi ........................ | 399/374 |
| 2007/0081212 A1 * | 4/2007 | Tonami et al. ............... | 271/3.14 |

FOREIGN PATENT DOCUMENTS

JP          9-86807 A        3/1997

\* cited by examiner

*Primary Examiner* — Jeremy R Severson

(74) *Attorney, Agent, or Firm* — Sughrue Mion, PLLC

(57) ABSTRACT

Disclosed is a document conveying apparatus including: a reading unit which read image information on a surface of a document; a driving-side discharge unit which conveys the document in a first direction in contact with the first surface, and discharges at least a part of the document; a driven-side discharge unit which receives transmission of a rotative force from the driving-side discharge unit, when being in contact with the driving-side discharge unit; a specific-direction conveying unit which conveys the document in an opposite direction to the first direction; a pressing force applying unit which applies a force in a third direction to the driven-side discharge unit so as to be in contact with the driving-side discharge unit; and a movement control unit which moves the driven-side discharge unit in an opposite direction to the third direction, when the document is in contact with the driven-side discharge unit.

11 Claims, 14 Drawing Sheets

US 8,740,216 B2

DOCUMENT CONVEYING APPARATUS AND DOCUMENT CONVEYING METHOD

This application is based upon and claims the benefit of priority from Japanese Patent Application No. 2011-142498, filed on Jun. 28, 2011, the disclosure of which is incorporated herein in its entirety by reference.

TECHNICAL FIELD

The present invention relates to a document conveying apparatus and a document conveying method, in particular to a document conveying apparatus, which comprises a downsized conveying mechanism and reads both sides of a sheet-like document, and a document conveying method thereof.

BACKGROUND ART

In recent years, an image reading system such as a fax machine, a copier or a scanner is equipped with a duplex document conveying apparatus which reads image information printed or drawn on both surfaces of a document. The duplex document conveying apparatus conveys the document automatically without turning front to back surface. The duplex document conveying apparatus comprises a conveying path for reading a front surface (a first surface) and that for reading a back surface (a second surface). Because of a demand for downsizing, in many of the duplex document conveying apparatuses, a part of the conveying path for reading a first surface is shared for reading a second surface.

In such a duplex document conveying apparatus, when a document elongated in a conveying direction is conveyed, there sometimes occurs overlapping of the document conveyances at the shared part of the conveying path. That is, two parts of the document, which are conveyed in directions different from each other, pass the same conveying path, simultaneously. In a related art, in order to avoid a contact between the two parts of the document, conveying rollers at the shared part are positioned separately from each other, or a gap is provided between the conveying rollers.

FIG. 13 shows an essential portion of a duplex document conveying apparatus disclosed in Japanese Patent Application Laid-Open No. 1997-086807. In the duplex document conveying apparatus 100, documents (not illustrated), which are set in a document feeding tray 101 are picked one sheet by one sheet by a picking roller 102, and are sent out to a nip area of a pair of sheet feeding rollers 103 and 104. The pair of sheet feeding rollers 103 and 104 sends out the conveyed document in a direction of an arrow 106 along a guide member 105. In the vicinity of an end of the guide member 105, arranged is a pair of first conveying rollers 107 and 108. By rotation of the pair of first conveying rollers 107 and 108, the document moves along a curved guide member 109. A conveying direction of the document changes from the horizontal direction to a downward direction indicated by an arrow 111. The document is further guided to a nip area of a pair of second conveying rollers 112 and 113.

On the document discharging side of the pair of second conveying rollers 112 and 113, a transparent plate 114 such as a platen glass is arranged horizontally. Underneath the transparent plate 114, arranged is a reading mechanism (not illustrated), which comprises a linear image sensor or an optical system along a primary scanning direction of the document. The document is conveyed by rotation of the pair of second conveying rollers 112 and 113 and passes between the transparent plate 114 and a guide member 115 arranged above the transparent plate. When the document passes the transparent plate, a first surface of the document is sequentially read at a document reading position 116 of the reading mechanism.

The document, for which the reading at the document reading position 116 has been completed, passes between a pair of third conveying rollers 117 and 118, and then, being guided by a guide member 119, is conveyed in a direction toward a pair of discharge/reverse rollers 121 and 122. When only one surface (the first surface) of the document is to be read, the document passes between the pair of discharge/reverse rollers 121 and 122, and then, is conveyed in a direction of an arrow 123 and is discharged into a document discharge tray (not illustrated), which is arranged underneath the document feeding tray 101.

In contrast, in the case of a duplex reading mode where both the first and second surfaces of the document are to be read, the trailing edge of the document conveyed in the direction of the arrow 123 after passing between the pair of discharge/reverse rollers 121 and 122 is detected by a document detection sensor 124 arranged before the pair of discharge/reverse rollers 121 and 123. On the basis of the time at which the trailing edge is detected, a rotation direction of the pair of discharge/reverse rollers 121 and 122 is reversed.

By the reversal of the rotation direction of the discharge/reverse rollers 121 and 122, the part having been the trailing edge until this time turns to a leading edge, and conveyance of the document in a direction of an arrow 125 along the guide member 119 starts. Guided by a guide member 126 located above the third conveying roller 117, the document is conveyed toward a nip area of the pair of first conveying rollers 107 and 108. Then, after passing between the pair of first conveying rollers 107 and 108, the document passes above the transparent plate 114 with the second surface facing downward. At this time, the second surface of the document is read sequentially.

The document, both surfaces of which have been read, described as above, passes between the pair of discharge/reverse rollers 121 and 122, and then is discharged into the document discharge tray, in the same way as the case where only the first surface was read.

In the duplex document conveying apparatus 100, described as above, when the second surface of the document is read, the document is conveyed on a loop-like route which passes from the pair of discharge/reverse rollers 121 and 122, through a series of the guide members 126, 109, 115 and 119 sequentially, and returns again to the pair of discharge/reverse rollers 121 and 122. If the length of the document in the conveying direction is longer than the length of the loop-like route, there occurs a state where two parts of the same document simultaneously pass between the pair of discharge/reverse rollers 121 and 122 in directions opposite to each other. Accordingly, a material with low friction coefficient is required to be employed as roller surfaces of the pair of discharge/reverse rollers 121 and 122, or the rollers needed to be separated from each other at a predetermined timing to create a gap between the rollers so that the two parts of the document pass each other there.

In the duplex document conveying apparatus 100 of the related art, a linkage mechanism having first to third link members, 133 to 135, which move a rotary shaft of the discharge/reverse roller 121 upward and downward, is fixed to a plunger 132 of a solenoid 131. In FIG. 13, the third link member 135 supports a rotary shaft 136 of the upper discharge/reverse roller 121. The first and second link members 133 and 134 move the discharge/reverse roller 121 upward and downward via the link member 135 according to moving of the plunger 132 into and out from the solenoid.

FIG. 14 specifically shows a mechanism for switching a pressing force exerted on the document by means of the pair of discharge/reverse rollers. One end of the first link member 133 for extending a length of the plunger is fixed to the plunger 132. To the other end of the first link member 133, one end of the second link member 134 is rotatably fixed. The second link member 134 has an obtusely bent shape. At the position of the bending, a pin 141 is fixed onto an immovable member (not illustrated) in the direction perpendicular to the drawing.

To the other end of the second link member 134, one end part of the third link member 135 having an elongated hole 142 at the other end part is fixed. In the elongated hole 142 of the third link member 135, a rotary shaft 136 of the discharge/reverse roller 121 is slidably arranged.

At the time of reading the second surface, the document 144 passes between the pair of discharge/reverse rollers 121 and 122 and is conveyed in the direction of the arrow 125. A leading edge of the document 144 passes the pair of first conveying rollers 107 and 108, the pair of second conveying rollers 112 and 113, and the pair of third conveying rollers 117 and 118, which are shown in FIG. 13, and returns again to the nip area of the pair of discharge/reverse rollers 121 and 122.

At the moment just before the leading edge 144A of the document 144 passes the pair of third conveying rollers 117 and 118, the document detection sensor 124 shown in FIG. 13 detects an arrival of the leading edge of the document. Then, an excitation circuit (not illustrated) excites the solenoid 131, and the plunger 132 moves in a direction of an arrow 145, i.e. the direction of discharging the document 144. Then, the second link member 134 rotates by a predetermined angle counterclockwise with the pin 141 as a supporting point. As a result, the discharge/reverse roller 121 on the driven side moves diagonally upward as shown by an arrow 146 in FIG. 14, thereby separates from the discharge/reverse roller 122 on the driving side.

As described above, while the document 144 passes between the pair of discharge/reverse rollers 121 and 122 in a "twofold" state, a pressing force exerted on the document 144 by these rollers is weakened. If a trailing edge of the document 144 has passed between the pair of discharge/reverse rollers 121 and 122, the excitation circuit (not illustrated) ends exciting the solenoid 131. Then, the plunger 132 returns to the original position by means of a spring (not illustrated). The pair of discharge/reverse rollers 121 and 122 pressingly contact the document 144 in a "onefold" state conveyed in the discharging direction from both sides of the document. As a result, thereafter, the pair of discharge/reverse rollers 121 and 122 conveys the document 144 in the discharging direction.

However, in the duplex document conveying apparatus 100 according to the related art shown in FIG. 13, the driving component such as the solenoid 131 is mounted, and the electric circuit forcibly separates the pair of discharge/reverse rollers 121 and 122 from each other during the specific period of time. Accordingly, the duplex document conveying apparatus 100 needs a region for mounting the above-described driving component and an electric circuit to control the driving component. Such a region is an obstacle to downsizing of the apparatus. Additionally, replacement of these components on their trouble increases the cost, then the operation rate of an image reading apparatus decreases.

In another related art, mutual pressing forces between the pair of discharge/reverse rollers 121 and 122 are weakened. At the time when the leading edge part of and the trailing edge part of the document pass each other, if the conveyed document has high rigidity, a gap between the rollers is forcibly widened by the rigidity of the document. As a result, the trouble due to the mutual contact between the two parts of the document in the "twofold" state, when the leading edge part and the trailing edge part pass each other, is reduced.

However, in this another related art, there arises a problem that the conveying force exerted on the document by the pair of discharge/reverse rollers 121 and 122 is insufficient when the document is in the "onefold" state. The pair of discharge/reverse rollers 121 and 122 has a first function to forcibly discharge the document into the discharge tray and a second function, at the time of reading the second surface in the duplex reading mode, to draw the document having moved to the discharge tray side back to the inside of the main body of the apparatus.

If these first and second functions become insufficient, during the period when an operation of the pair of discharge/reverse rollers 121 and 122 contributes to the conveying of the document, a conveying speed of the document at the document reading position 116 becomes unstable. At that time, there occurs a trouble in that an image reading operation in a secondary scanning direction becomes unstable and the image quality is accordingly degraded.

Further, when downsizing the duplex document conveying apparatus 100, the curved guide member 109 needs to have a bus shape with a large curvature. A conveying load from the document conveyed on such a guide member 109 is so large that the conveying force by the pair of discharge/reverse rollers 121 and 122 is lowered. Therefore, the duplex document conveying apparatus 100 according to the another related art is not suitable for downsizing.

SUMMARY

The object of the present invention is to provide a document conveying apparatus which, in a state where a document passes a pair of rollers with its two parts overlapping with each other and conveyed in opposite directions, causes the rollers to separate from each other mechanically or to reduce a mutual pressure between the rollers, and a document conveying method thereof.

A document conveying apparatus, according to an exemplary aspect of the invention, includes: a reading unit which reads image information on a surface of a sheet-like document; a driving-side discharge unit which conveys a document in a first direction, first image information on a first surface of the document having been read by the reading unit, in contact with the first surface of the document, and discharges at least a part of the document from the document conveying apparatus; a driven-side discharge unit, arranged so as to face the driving-side discharge unit, receives transmission of a rotative force from the driving-side discharge unit, when being in contact with the driving-side discharge unit; a specific-direction conveying unit which conveys the document conveyed from the driving-side discharge unit in a second direction, opposite to the first direction, so that the reading unit reads second image information on a second surface of the document; a pressing force applying unit which applies a force in a third direction to the driven-side discharge unit so that the driven-side discharge unit is in contact with the driving-side discharge unit; and a movement control unit which moves the driven-side discharge unit in a fourth direction, opposite to the third direction, when the document conveyed by the specific-direction conveying unit is in contact with the driven-side discharge unit.

A document conveying method for conveying a sheet-like document in a document conveying apparatus, according to an exemplary aspect of the invention, includes: reading first image information on a first surface of the document; conveying the document in a first direction, and discharging at least a part of the document from the document conveying apparatus by means of a driving roller and a driven roller; detecting a trailing edge of the document conveyed in the first direction; reversing a conveying direction of the document, and conveying the document in a second direction, opposite to the first direction, on a basis of the detecting the trailing edge; applying a tensile force to the document in a document conveying direction; moving the driven roller which applies a pressing force in a third direction to the driving roller, in a fourth direction, opposite to the third direction, so that the pressing force is reduced; and reading second image information on a second surface of the document.

A document conveying apparatus, according to an exemplary aspect of the invention, includes: reading means for reading image information on a surface of a sheet-like document; driving-side discharge means for conveying a document in a first direction, first image information on a first surface of the document having been read by the reading means, in contact with the first surface of the document, and discharging at least a part of the document from the document conveying apparatus; driven-side discharge means, arranged so as to face the driving-side discharge means, for receiving transmission of a rotative force from the driving-side discharge means, when being in contact with the driving-side discharge means; specific-direction conveying means for conveying the document conveyed from the driving-side discharge means in a second direction, opposite to the first direction, so that the reading means reads second image information on a second surface of the document; pressing force applying means for applying a force in a third direction to the driven-side discharge means so that the driven-side discharge means is in contact with the driving-side discharge means; and movement control means for moving the driven-side discharge means in a fourth direction, opposite to the third direction, when the document conveyed by the specific-direction conveying means is in contact with the driven-side discharge means.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, exemplary embodiments of the present invention will be described in detail with reference to the drawings.

First Exemplary Embodiment

Figure 1:
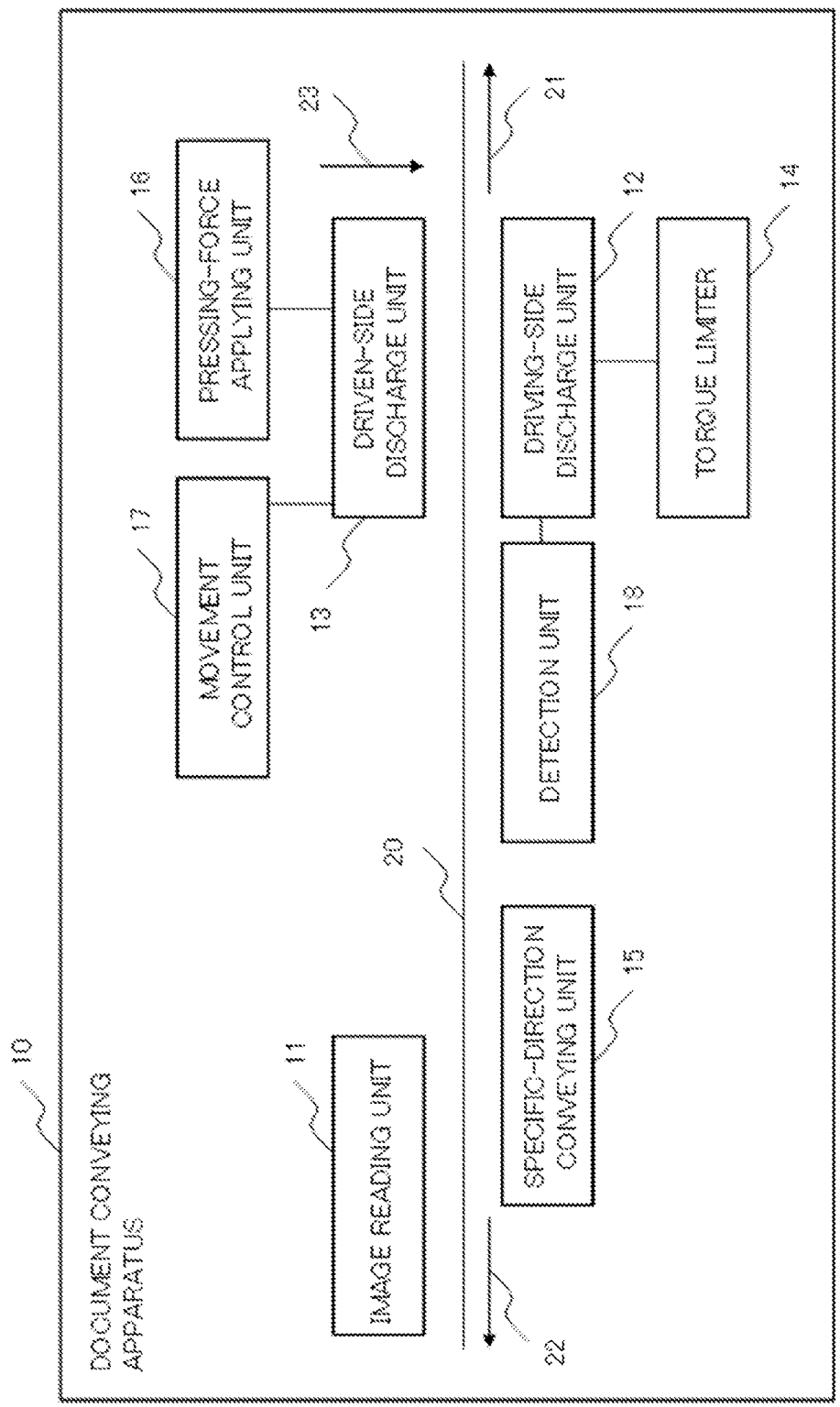
FIG. 1 shows an example of a configuration of a duplex document conveying apparatus according to a first exemplary embodiment of the present invention.

With reference to FIG. 1, description will be given of a configuration of a duplex document conveying apparatus according to a first exemplary embodiment of the present invention.

The duplex document conveying apparatus 10 comprises an image reading unit 11, a driving-side discharge unit 12, a driven-side discharge unit 13, a torque limiter 14, a specific-direction conveying unit 15, a pressing force applying unit 16 and a movement control unit 17.

The image reading unit 11 reads image information on a predetermined surface of a conveyed sheet-like member, which is a document. The sheet-like member, on which the image information has been read, is conveyed in a first direction 21 on a conveying path 20.

Rotationally contacting the sheet-like member in this state, the driving-side discharge unit 12 sends out the sheet-like member in the first direction 21, which is a direction of discharging the sheet-like member outside the apparatus.

The driven-side discharge unit 13 is arranged so as to face the driving-side discharge unit 12. To the driven-side discharge unit 13, when rotationally contacting the driving-side discharge unit 12, given is a force to rotate in a direction opposite to the rotation direction of the driving-side discharge unit 12.

In the vicinity of the driving-side discharge unit 12, disposed is a detection unit 18 for detecting a trailing edge of the sheet-like member to pass.

The torque limiter 14 restricts a rotational action on a rotary shaft of the driving-side discharge unit 12, when a torque equal to or higher than a predetermined value is exerted on the driving-side discharge unit 12.

The specific-direction conveying unit 15 is arranged at a position a predetermined distance away from the driven-side discharge unit 13 in a second direction 22, which is opposite to the first direction 21. The specific-direction conveying unit 15 forcibly conveys the sheet-like member in a direction to approach the image reading unit 11, when the sheet-like member is conveyed through the driven-side discharge unit 13.

The pressing force applying unit 16 continually applies a predetermined pressing force to a rotary shaft of the driven-side discharge unit 13 in a third direction 23, so that the driven-side discharge unit 13 and the driving-side discharge unit 12 pressingly contact each other.

The movement control unit 17 moves the driven-side discharge unit 13, to which a pressing force is applied by the pressing force applying unit 16, in a direction opposite to the third direction 23 with respect to the driving-side discharge unit 12. The driven-side discharge unit 13 moves according to a magnitude of a force component in a direction opposite to the third direction 23, in which the sheet-like member conveyed by the specific-direction conveying unit 15 exerts on the driven-side discharge unit 13 through its contacting a surface of the driven-side discharge unit 13.

Figure 2:
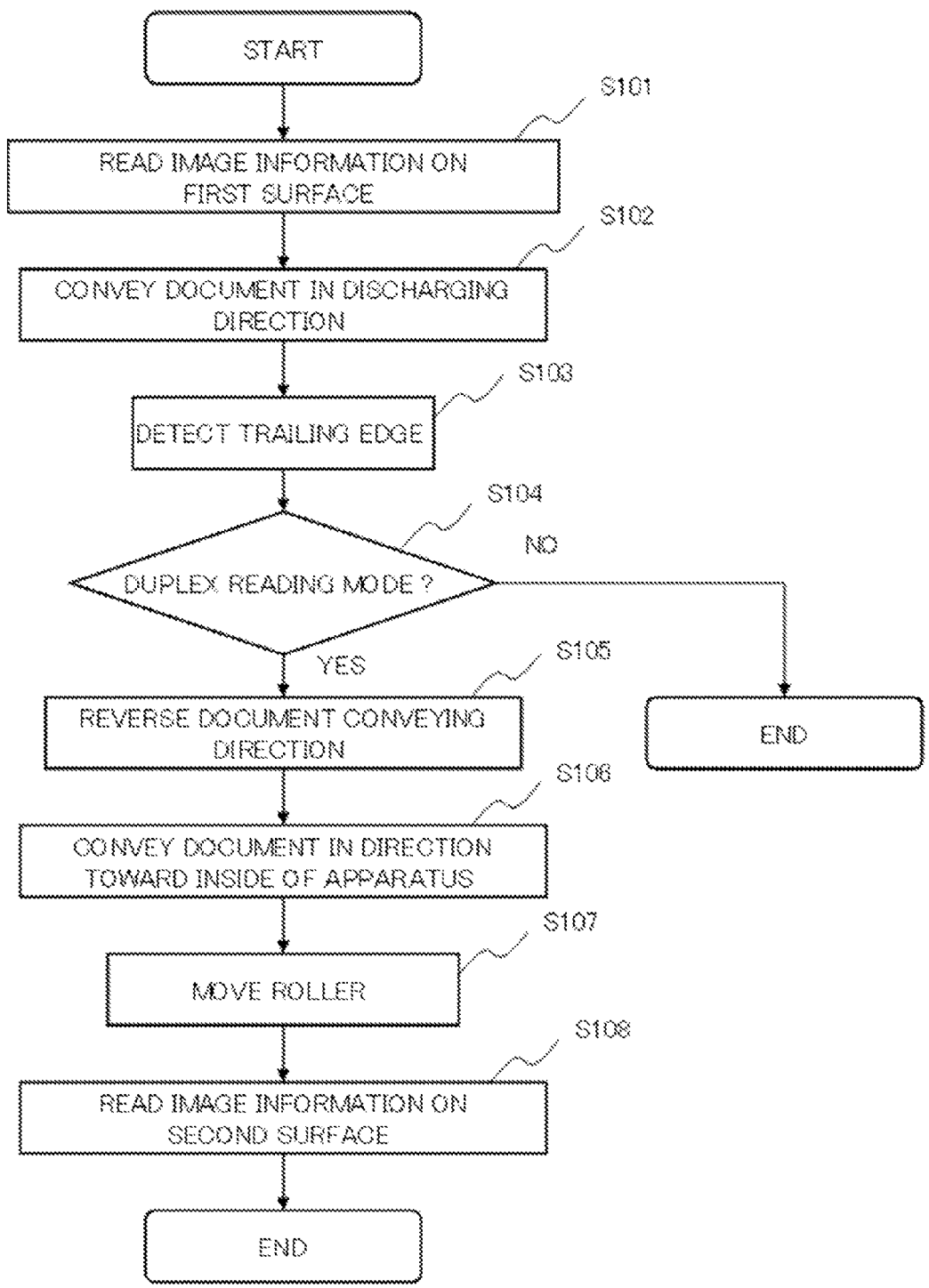
FIG. 2 is a flow chart showing an example of operation of the duplex document conveying apparatus according to the first exemplary embodiment of the present invention.

With reference to FIG. 2, description will be given of a document conveying method in the duplex document conveying apparatus according to the first exemplary embodiment of the present invention.

FIG. 2 is a flow chart showing an example of a process flow of conveying the document in the duplex document conveying apparatus according to the first exemplary embodiment of the present invention.

First, a sheet-like member, which is the document, is conveyed, and image information on a predetermined surface (a first surface) is read (Step S101).

The sheet-like member, image information on which has been read, is conveyed in the first direction 21, which is a direction to discharge the sheet-like member outside the apparatus, by rotation of the driving roller included in the driving-side discharge unit 12 (Step S102).

While the sheet-like member is discharged, a trailing edge of the sheet-like member is detected by the detection unit 18 disposed in the vicinity of the driving-side discharge unit 12 (Step S103).

At that time, determined is whether or not the mode is a duplex reading mode to read image information on both surfaces of the sheet-like member (Step S104). This determination may be inputted in advance by a user. Alternatively, the determination may be performed on the basis of a result of detecting image information on both surfaces of the sheet-like member by another detection unit (not illustrated).

When the mode is not the duplex reading mode (NO at Step S104), the sheet-like document is discharged outside the apparatus, and the document reading process is finished.

When the mode is the duplex reading mode (YES at Step S104), at the time when the detection unit 18 detects the trailing edge of the sheet-like member, reversed is the rotation of the driving roller included in the driving-side discharge unit 12. That is, the direction of conveying the sheet-like member is reversed, to start conveying the sheet-like member in a direction to return back into the apparatus.

The conveying of the sheet-like member is accelerated by the specific-direction conveying unit 15, and the sheet-like member is conveyed toward the image reading unit 11 (Step S106).

While the sheet-like member is conveyed by the specific-direction conveying unit 15, the rotation of the driving roller included in the driving-side discharge unit 12 is reversed again. At that moment, if the sheet-like member is so long in the conveying direction as still to have a part passing between the driving-side discharge unit 12 and the driven-side discharge unit 13 pressingly contacting it, a driven roller included in the driven-side discharge unit 13 moves (Step S107). That is, the driven roller moves against the pressing force toward the driving roller, according to a magnitude of the force the sheet-like member exerts on the driven roller. As a result, the driven roller and the driving roller separate from each other, or the pressing force between them is reduced.

Then, image information on a second surface of the sheet-like member conveyed is read by the image reading unit 11 (Step S108).

Figure 3:
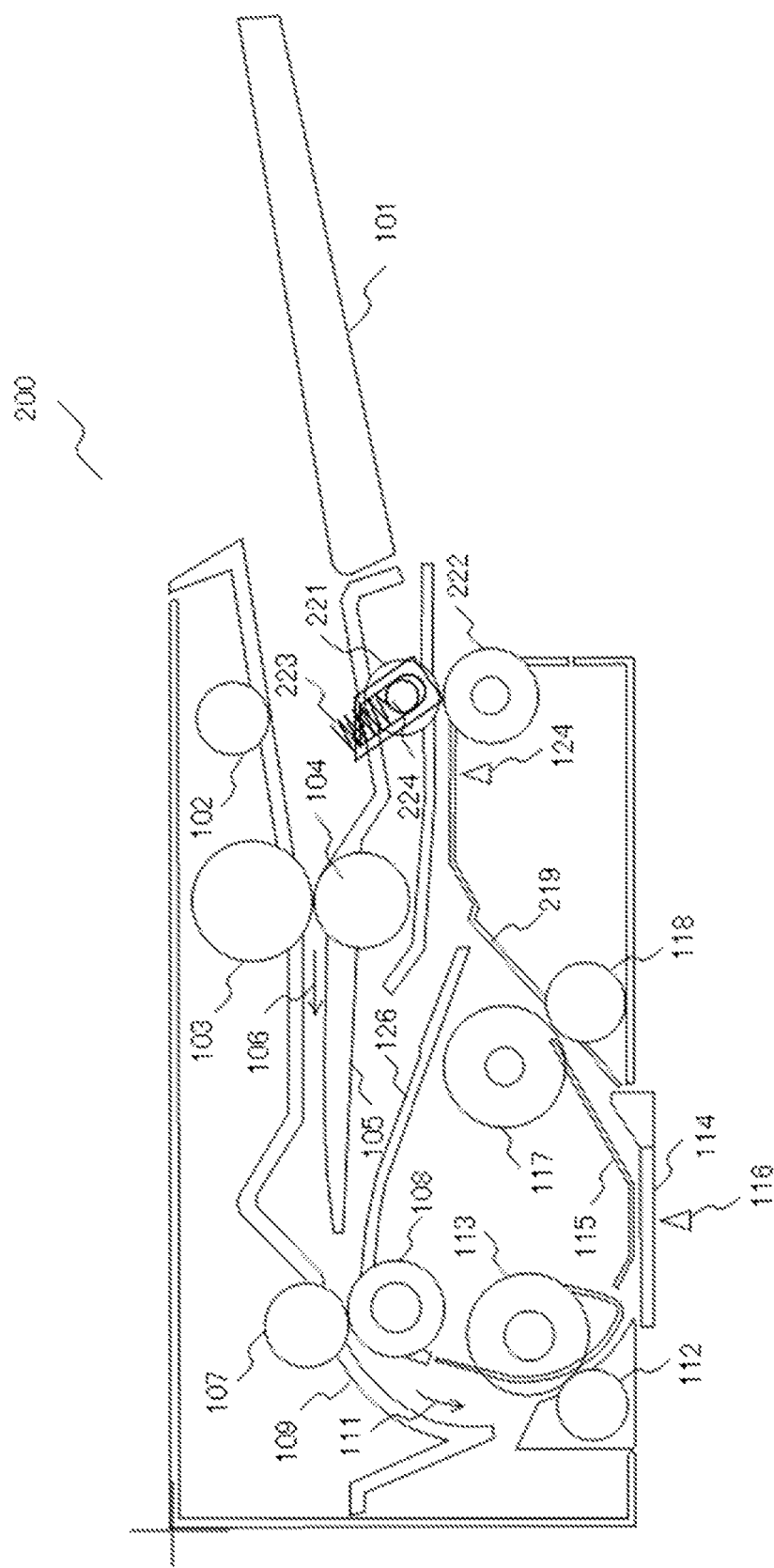
FIG. 3 shows an example of a configuration of an essential part of the duplex document conveying apparatus according to the first exemplary embodiment of the present invention.
Figure 13:
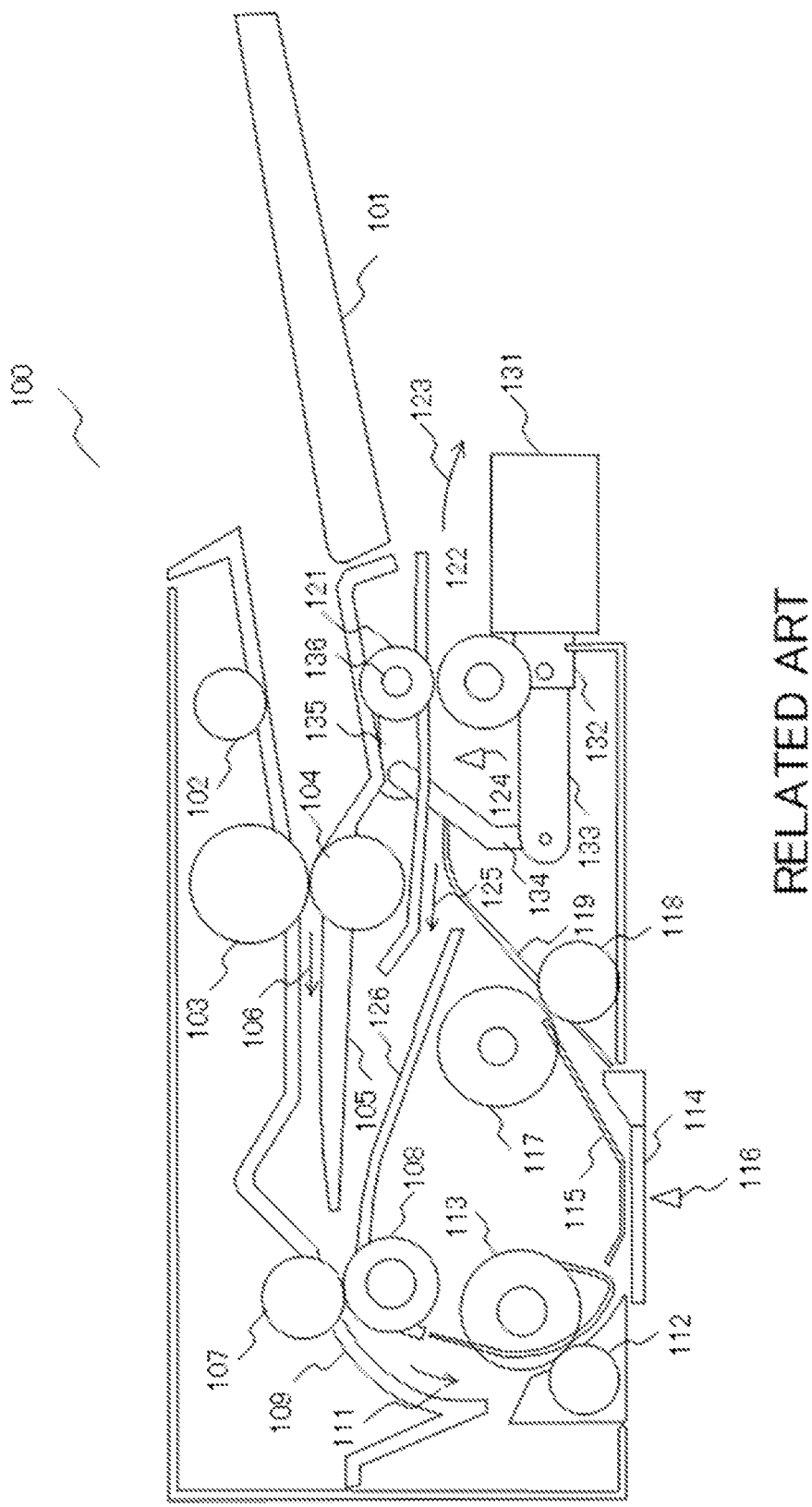
FIG. 13 shows a configuration of a duplex document conveying apparatus in a related art.

FIG. 3 shows an example of a configuration of an essential part in the duplex document conveying apparatus according to the first exemplary embodiment of the present invention. In the duplex document conveying apparatus 200, the same reference numerals are given to the elements as those in FIG. 13.

With reference to FIG. 3, an outline of the configuration of the duplex document conveying apparatus 200 will be described.

A pick roller 102 picks documents (not illustrated) one sheet by one sheet from a document feeding tray 101 to the inside of the apparatus' main body. A pair of sheet feeding rollers 103 and 104 is arranged behind the pick roller 102, and conveys the picked document in a direction indicated by an arrow 106, along a guide member 105, to a nip area of a pair of first conveying rollers 107 and 108. The pair of first conveying rollers 107 and 108 changes the direction of the conveyed document to a direction indicated by an arrow 111 along a curved guide member 109, thereby guides the document to a nip area of a pair of second conveying rollers 112 and 113.

In the vicinity of a discharging side of the pair of second conveying rollers 112 and 113, a transparent plate 114, such as a platen glass, is arranged horizontally. Beneath the transparent plate 114 and along a primary document scanning direction, arranged is a reading mechanism (not illustrated), which includes a linear image sensor and an optical system. By rotation of the pair of second conveying rollers 112 and 113, the document passes between the transparent plate 114 and a guide member 115 arranged above it, and during that time, a first surface of the document is read sequentially at a document reading position 116 of the reading mechanism.

At an end part of the guide member 115, a pair of third conveying rollers 117 and 118 is arranged. The document, image information on which has been read at the document reading position 116, passes between the pair of third conveying rollers 117 and 118, and guided by a guide member 219, is conveyed to a pair of discharge/reverse rollers 221 and 222 arranged at a discharging position of the apparatus' main body. At a position just before the pair of discharge/reverse rollers 221 and 222, a document detection sensor 124 is arranged.

Between the pair of discharge/reverse rollers 221 and 222, the discharge/reverse roller 222 arranged on the lower side is a driving roller. The discharge/reverse roller 221 arranged on the upper side pressingly contacting the discharge/reverse roller 222 is a driven roller. A surface of the driven-side discharge/reverse roller 221 includes a material with a high friction coefficient such as a resin and a rubber.

The driven-side discharge/reverse roller 221 is pressed against the driving-side discharge/reverse roller 222 at a predetermined pressure by a pressing mechanism using a pressure spring 223. By this way, a conveying force is transmitted from the driving-side discharge/reverse roller 222 to the document. An electromagnetic clutch (not illustrated) is mounted to a rotary shaft of the discharge/reverse roller 222 or to a rotary shaft of a gear (not illustrated), which is arranged in the vicinity of and linked to the rotary shaft of the discharge/reverse roller 222. By switching on and off the electromagnetic clutch, the rotation direction of the driving-side discharge/reverse roller 222 is controlled. Further, a torque limiter (not illustrated) is mounted to the rotary shaft of the discharge/reverse roller 222. When a load equal to or larger than a predetermined value is loaded on the discharge/reverse roller 222, the torque limiter controls the roller to rotate idly so that the driving force is not transmitted. In this way, the discharge/reverse roller 222 and the electromagnetic clutch are protected.

Figure 4:
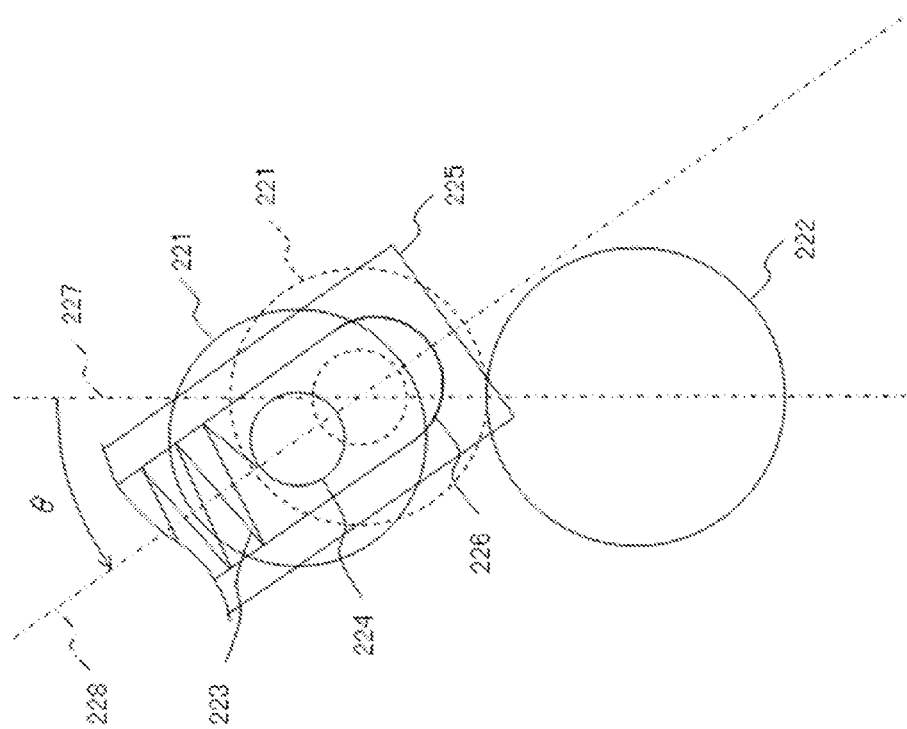
FIG. 4 shows an enlarged view of an example of an essential part of a pair of discharge/reverse rollers and a pressing mechanism according to the first exemplary embodiment of the present invention.

FIG. 4 shows an essential part of the pair of discharge/reverse rollers 221 and 222, and the pressing mechanism. A rotary shaft 224 of the discharge/reverse roller 221, which is a driven roller located on the upper side, is arranged movably upward and downward in an elongated hole 226 provided in a bearing member 225, one end part of which is fixed to an immovable member (not illustrated).

In FIG. 4, the discharge/reverse roller 221 illustrated with broken lines is the discharge/reverse roller in the state where a surface of the discharge/reverse roller 221 is pressingly contacted to a surface of the discharge/reverse roller 222 by the pressing force from the pressure spring 223. The discharge/reverse roller 221 illustrated with solid lines is the discharge/reverse roller in the state of being separated from the surface of the discharge/reverse roller 222. Although the only one bearing member 225 is shown in FIG. 4, the bearing member is arranged at each of both ends of the rotary shaft 224 of the discharge/reverse roller 221 which is a driven roller.

In FIG. 4, a line segment crossing the center of the elongated hole 226 and parallel to the longitudinal direction of the elongated hole is defined as a first line segment 228. Also, a line segment crossing the center of the rotary shaft of the discharge/reverse roller 222, which is a driving roller, and the center of the rotary shaft 224 of the discharge/reverse roller 221 is defined as a second line segment 227. There, the elongated hole 226 of the bearing member 225 is inclined with an angle $\theta$. This direction of the elongated hole 226 is determined such that the second line segment 228 is acute-angled with respect to a direction toward a position in FIG. 3 where the pair of first conveying rollers 107 and 108 is located. That is, the direction of the elongated hole 226 is determined such that the force straining the surface of the document 144 in the conveying direction has a component in the direction of the second line segment 228 with a magnitude sufficient to separate the discharge/reverse rollers 221 and 222 from each other.

The pair of first conveying rollers 107 and 108 is preferably arranged such that a position of contact between the conveying rollers 107 and 108 is higher than a position of contact between the discharge/reverse rollers 221 and 222. By this way, interference between the bearing member 225 and the conveying path of a document can be prevented. In addition, when the document changes the conveying direction along the guide member 109, it is possible to make a curvature of the document smaller and thus a conveying speed larger. Further, damage to the document caused by passing inside the document conveying apparatus is suppressed.

Further, in the duplex document conveying apparatus 200 according to the first exemplary embodiment of the present invention, a pressure control mechanism for between the pair of discharge/reverse rollers 221 and 222 is arranged on the driven roller side with respect to the direction of discharging and reversing the document.

Additionally, an operation of the pair of first conveying rollers 107 and 108 is set such that its conveying amount per unit time is larger than that of the pair of discharge/reverse rollers 221 and 222. By this way, while the document is conveyed in the direction toward the inside of the apparatus' main body, passing simultaneously between the pair of discharge/reverse rollers 221 and 222 and between the pair of first conveying rollers 107 and 108, the document surface between these pairs of rollers is pulled in the conveying direction. As a result, the rotary shaft 224 of the discharge/reverse roller 221, which is the driven roller, is raised along the elongated hole 226 against the downward pressing force from the pressure spring 223, as illustrated with solid lines in FIG. 4. In this state, the pressing force from the discharge/reverse roller 221 to the discharge/reverse roller 222, which is the driving roller, is reduced, or the pair of discharge/reverse rollers 221 and 222 are separated from each other.

In contrast, while the document is conveyed in the direction toward the discharging side of the apparatus' main body, passing simultaneously the pair of first conveying roller 107 and 108 and the pair of discharge/reverse rollers 221 and 222, the document surface is slacked between these pairs of rollers. As a result, the discharge/reverse roller 221, which is the driven roller, is pressingly contacted to the discharge/reverse roller 222 by the downward pressing force from the pressure spring 223, as illustrated with broken lines in FIG. 4. In this state, the pressing force from the discharge/reverse roller 221 to the discharge/reverse roller 222, which is the driving roller, increases.

Figure 5:
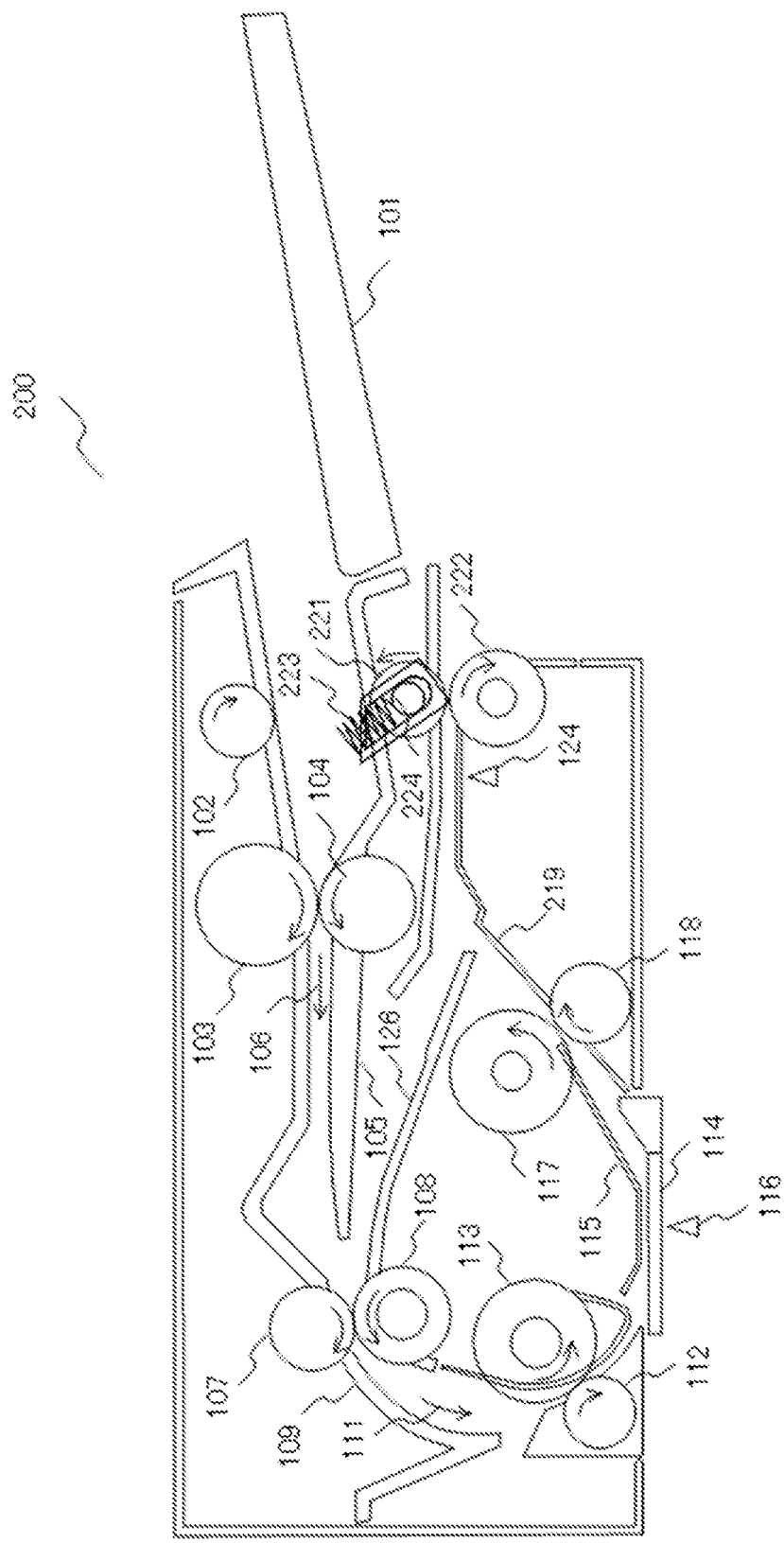
FIG. 5 shows an example of operation of each roller, at the time of conveying the document, in the duplex document conveying apparatus according to the first exemplary embodiment of the present invention.

FIG. 5 shows a rotation direction of each roller in the duplex document conveying apparatus according to the first exemplary embodiment of the present invention, during the conveying operation. Here, the pick roller 102 needs only to rotate clockwise, as illustrated, when picking a document (not illustrated) to feed it. Rollers of the pair of feeding rollers 103 and 104 need only to rotate in directions of respective arrows while the document picked by the pick roller 102 is conveyed. Rollers of the pairs of first to third conveying rollers 107, 108, 112, 113, 117 and 118 rotate in directions indicated by respective arrows, so that the document moves in the same conveying direction. Their rotations may be limited to the period while the document moves or passes. This limitation is the same as that on other rollers.

In a mode other than the duplex reading mode, the rollers of the pair of discharge/reverse rollers 221 and 222 rotate in directions indicated by respective arrows so that the document moves in the direction toward the discharge tray. This operation is the same also while the document is discharged in the direction toward the discharge tray after the first surface is read in the duplex reading mode.

When reading of the first surface of the document is completed, in the duplex reading mode, and a trailing edge of the document reaches the vicinity of the pair of discharge/reverse rollers 221 and 222, the document detection sensor 124 detects the trailing edge. At that moment, switching of on and off operation in the electromagnetic clutch is performed, and then the pair of discharge/reverse rollers 221 and 222 starts rotating in directions opposite to those of the arrows illustrated in FIG. 5.

With reference to FIGS. 6 to 10, description will be given for the process where the long document in the conveying direction is conveyed within the duplex document conveying apparatus according to the first exemplary embodiment of the present invention, for each stage of the conveyance.

Figure 6:
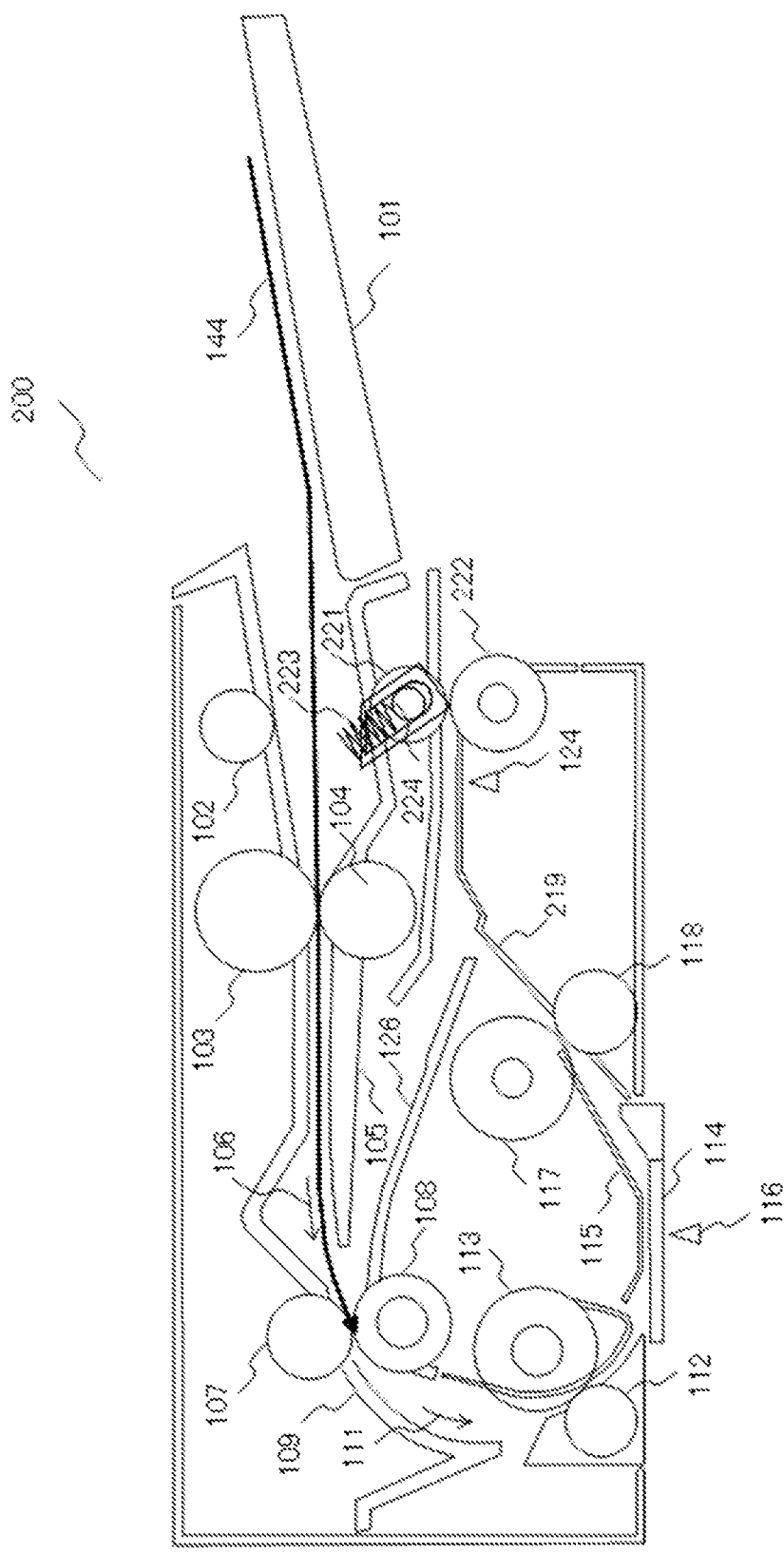
FIG. 6 shows an example of a state of conveying the document in the duplex document conveying apparatus according to the first exemplary embodiment of the present invention.

FIG. 6 shows a state at the time when the leading edge of the document 144 has reached the nip area of the pair of first conveying rollers 107 and 108 after the document 144 was sent out from the document feeding tray 101 and was conveyed in a direction of an arrow 106 by the pair of feeding roller 103 and 104.

Figure 7:
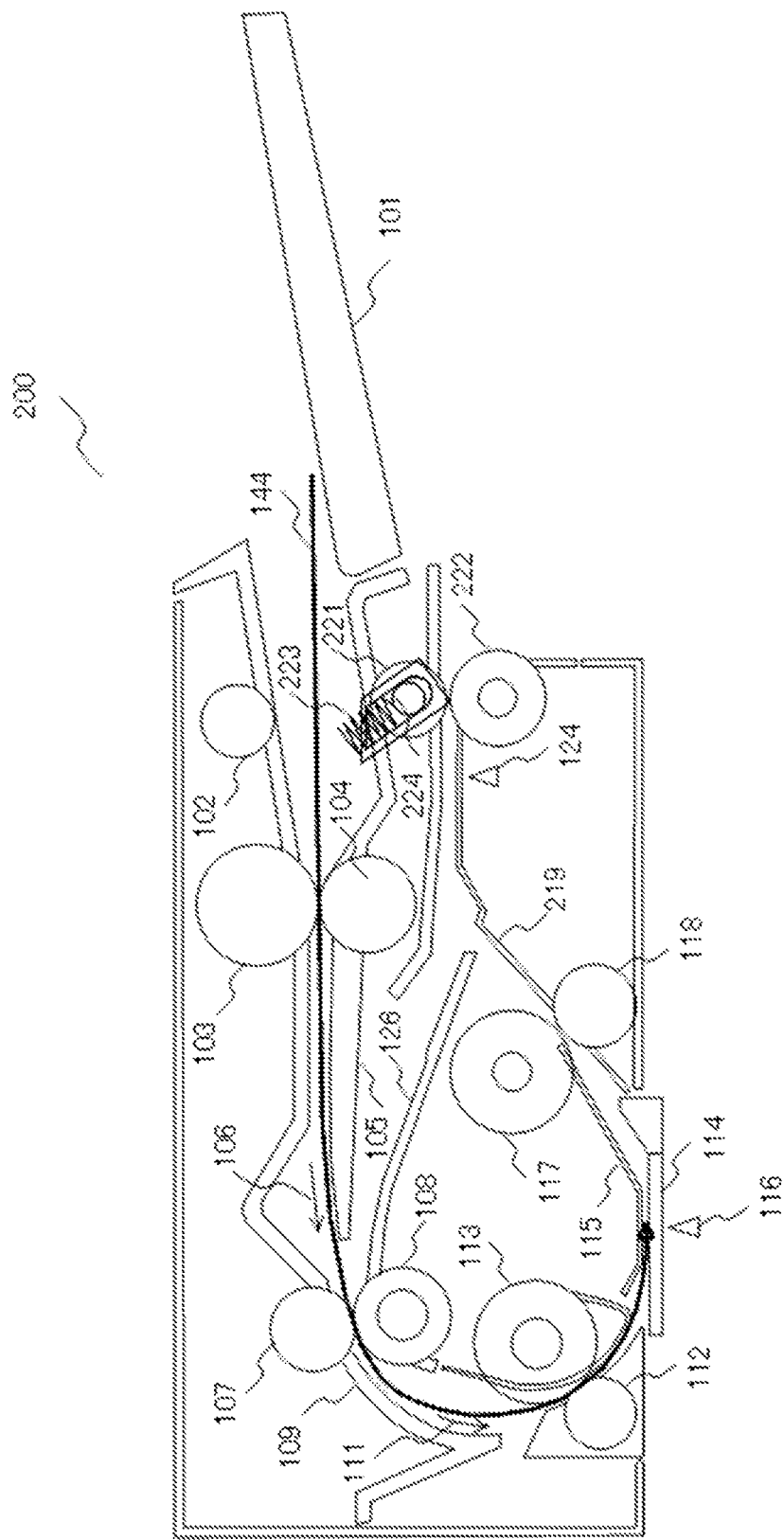
FIG. 7 shows an example of a state of conveying the document in the duplex document conveying apparatus according to the first exemplary embodiment of the present invention.

FIG. 7 shows a state where the document 144 has been further conveyed from the position shown in FIG. 6. The leading edge of the document 144 reaches the document reading position 116 after passing the pairs of first and second conveying rollers 107 and 108, and 112 and 113. From this time, reading of image information on the first surface of the document 144 starts. In this example, the trailing edge of the document 144 still remains at the document feeding tray 101.

Figure 8:
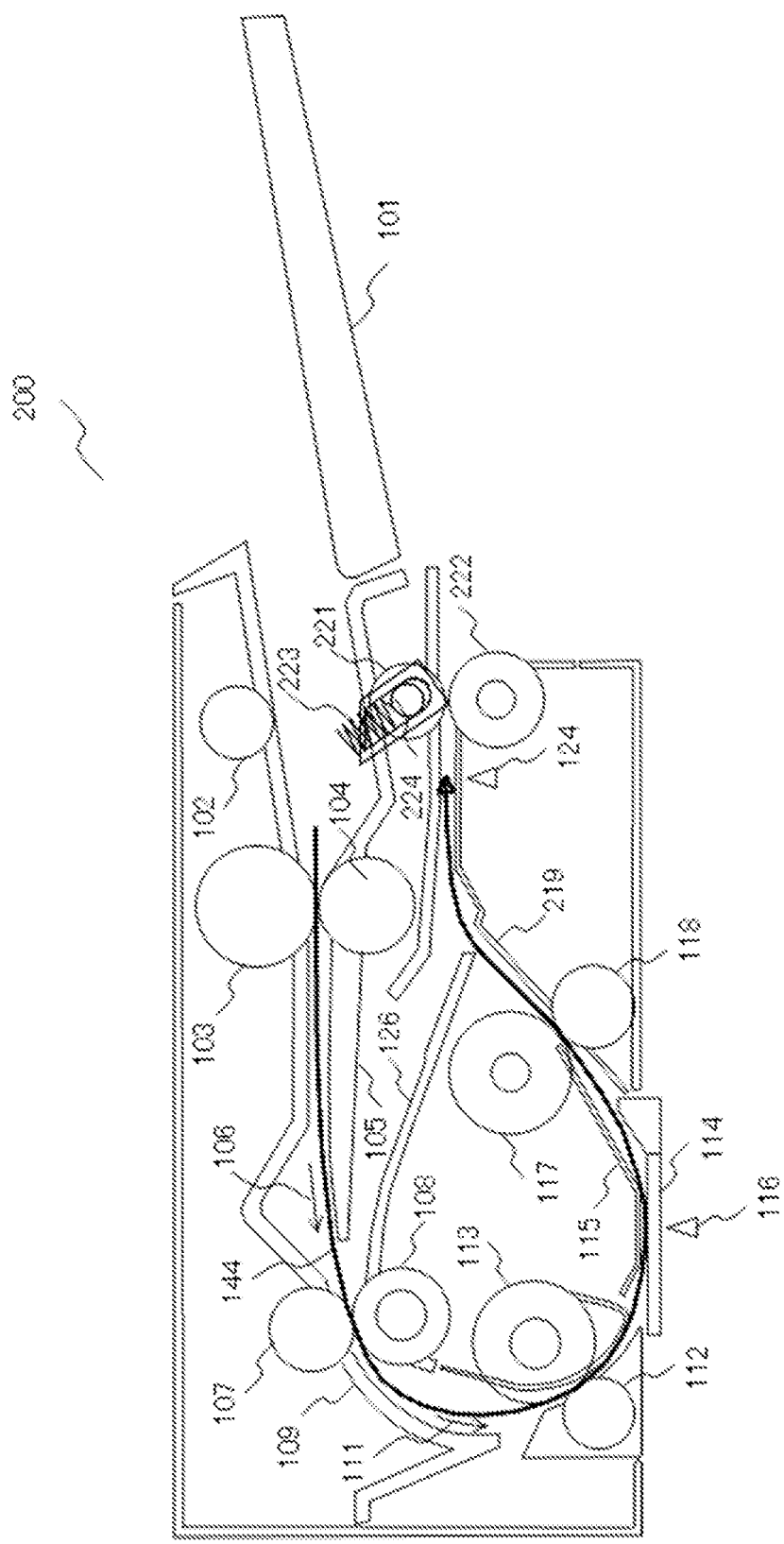
FIG. 8 shows an example of a state of conveying the document in the duplex document conveying apparatus according to the first exemplary embodiment of the present invention.

FIG. 8 shows a state where the document 144 has been further conveyed from the position shown in FIG. 7. The leading edge of the document 144 has reached a detecting position of the document detection sensor 124. The trailing edge of the document 144 passes the pair of feeding roller 103 and 104. At this time, at the document reading position 116, the reading of the first surface of the document 144 is being performed.

Figure 9:
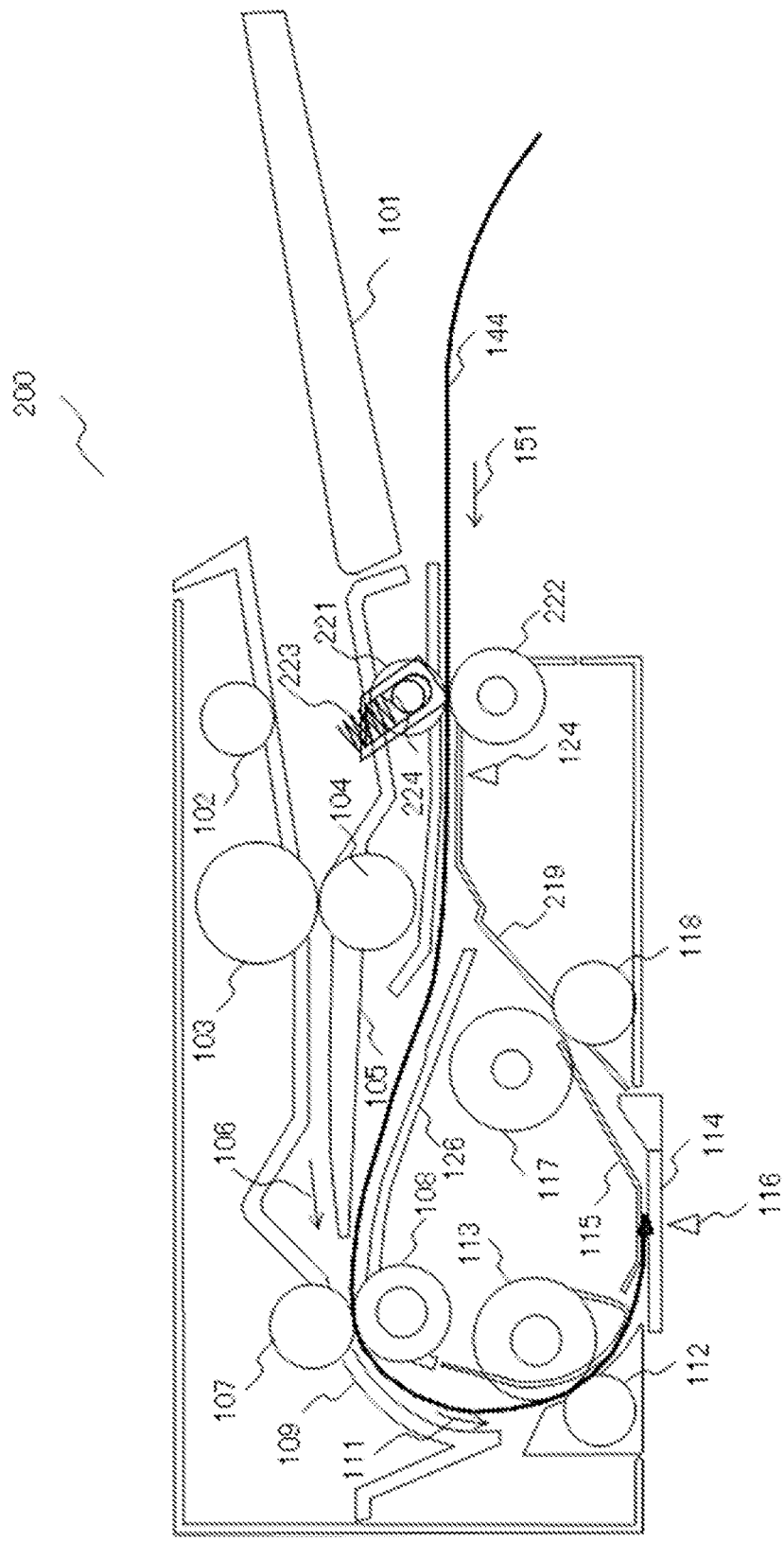
FIG. 9 shows an example of a state of conveying the document in the duplex document conveying apparatus according to the first exemplary embodiment of the present invention.

FIG. 9 shows a state where the document 144 has been sent inside the apparatus' main body after completing the reading of the first surface of the document 144, to read another surface (a second surface). When the reading of the first surface of the document 144 is completed, the trailing edge of the document 144 turns to a leading edge of the document to be sent to the inside of the apparatus' main body in the process of reading the second surface in the duplex reading mode. The pair of discharge/reverse rollers 221 and 222 rotates in directions opposite to those shown in FIG. 5, thereby the document 144 is conveyed in a direction of an arrow 151 between the pair of rollers.

When the leading edge of the document 144 reaches the first conveying rollers 107 and 108, the leading edge is detected. At this time, the switching of on and off operation of the electromagnetic clutch is performed, and accordingly the pair of discharge/reverse rollers 221 and 222 starts rotating in the direction indicated in FIG. 5. However, if the document 144 is long in the conveying direction, a part of the document 144 still remains between the pair of discharge/reverse rollers 221 and 222 at this time. Then, the direction of conveying the document 144 by the pair of discharge/reverse rollers 221 and 222 and that by the first conveying rollers 107 and 108 are opposite to each other. The pair of discharge/reverse rollers 221 and 222 is loaded, and accordingly the rotation of the rotary shafts of the pair of discharge/reverse rollers 221 and 222 is limited by the torque limiter (not illustrated). In the case that the pair of discharge/reverse rollers 221 and 222 is in contact with the document 144, the rotary shafts are caused to rotate idly. From this time, the document 144 passes between the pair of discharge/reverse rollers 221 and 222 and between the first conveying rollers 107 and 108, while keeping a predetermined strained state caused by the first conveying rollers 107 and 108 pulling it.

The leading edge of the conveyed document 144 reaches the document reading position 116 from the pair of first conveying rollers 107 and 108 via the pair of second conveying rollers 112 and 113. FIG. 9 shows the state of the document 144 at that moment. At this time, reading of image information on the second surface of the document 144 starts. The second surface of the document 144 faces the document reading position 116, thereby the reading of the second surface is performed. In FIG. 9, a trailing edge of the document 144 which is long in the conveying direction still remains on the discharge tray side of the pair of discharge/reverse rollers 221 and 222.

Figure 10:
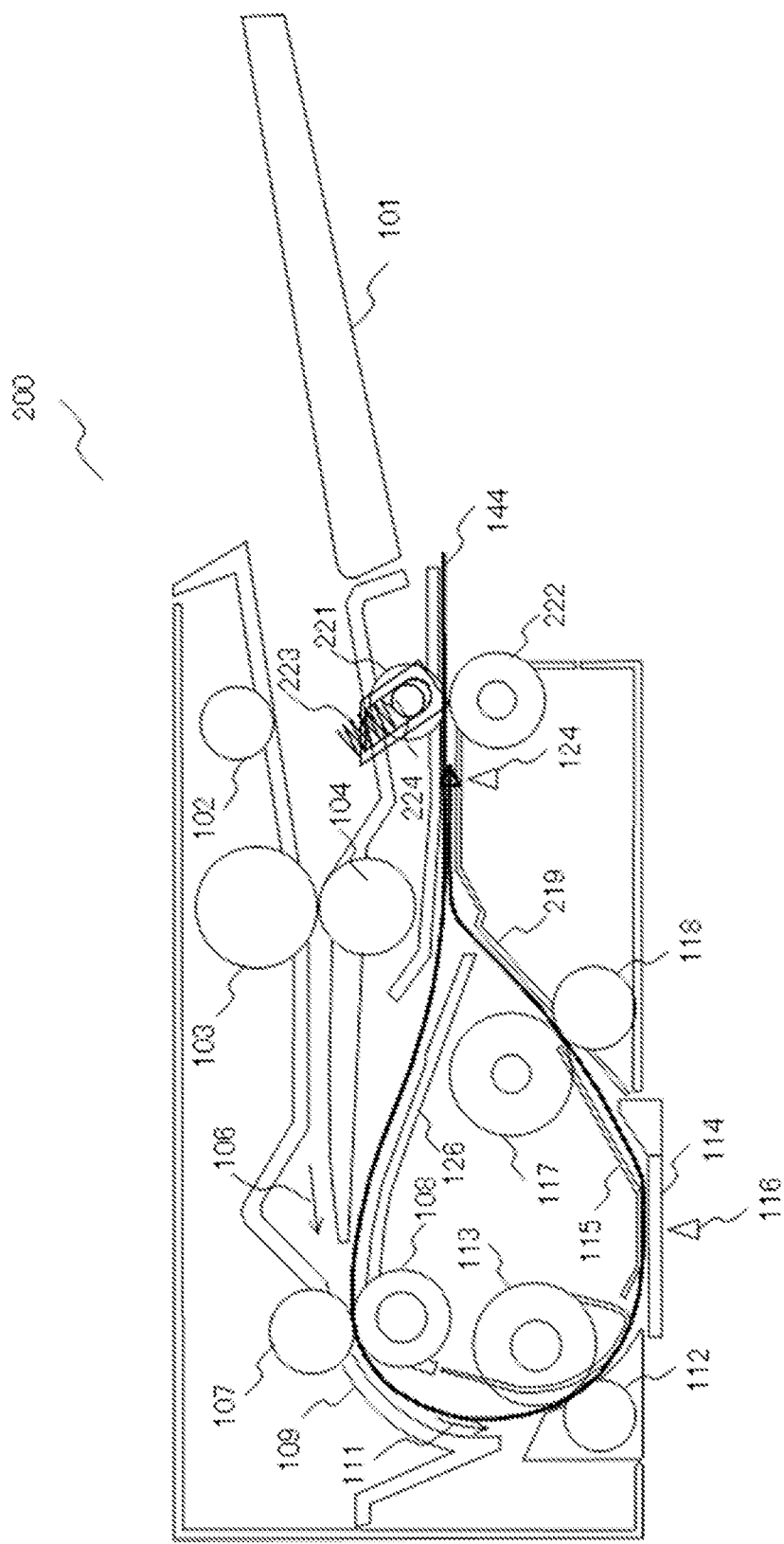
FIG. 10 shows an example of a state of conveying the document in the duplex document conveying apparatus according to the first exemplary embodiment of the present invention.
Figure 14:
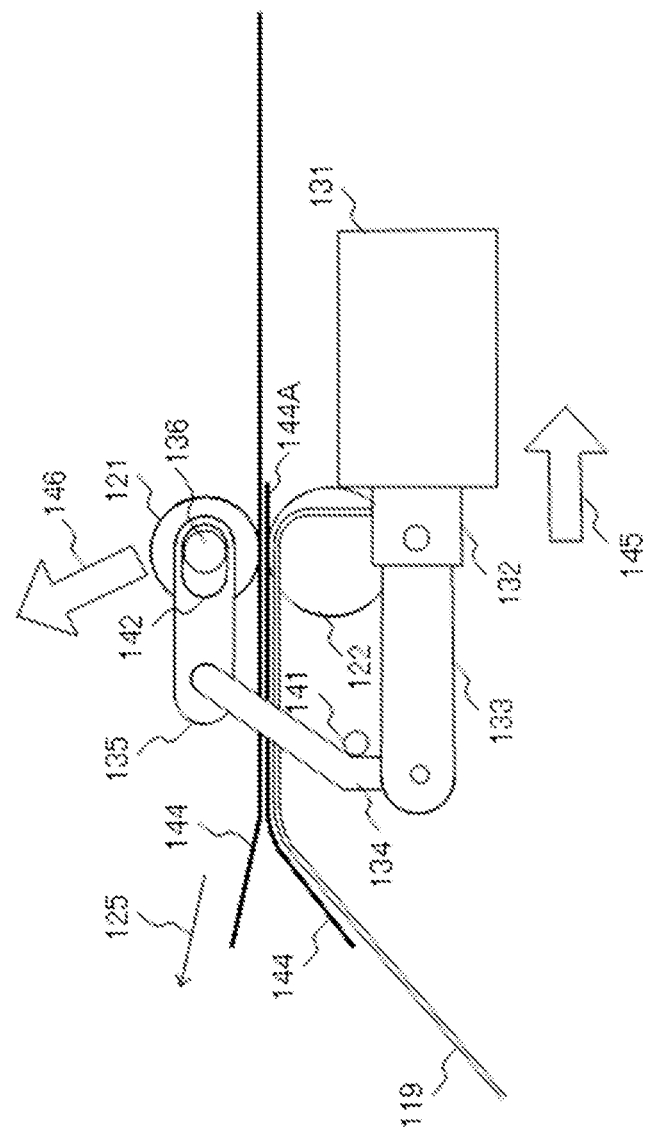
FIG. 14 shows a configuration of a pair of discharge/reverse rollers in the related art.

FIG. 10 shows a state where the document has been further conveyed from the position shown in FIG. 9. The leading edge of the document 144 reaches the position of the document detection sensor 124 after passing the pair of third conveying rollers 117 and 118. In this state, the image information on the second surface of the document 144 is being read. The trailing edge of the document 144 still remains on the discharge tray side of the pair of discharge/reverse rollers 221 and 222. After this state, when the document 144 is long in the conveying direction, similarly to that in FIG. 14, the document passes between the pair of discharge/reverse rollers 221 and 222 in the "twofold" state.

Figure 11:
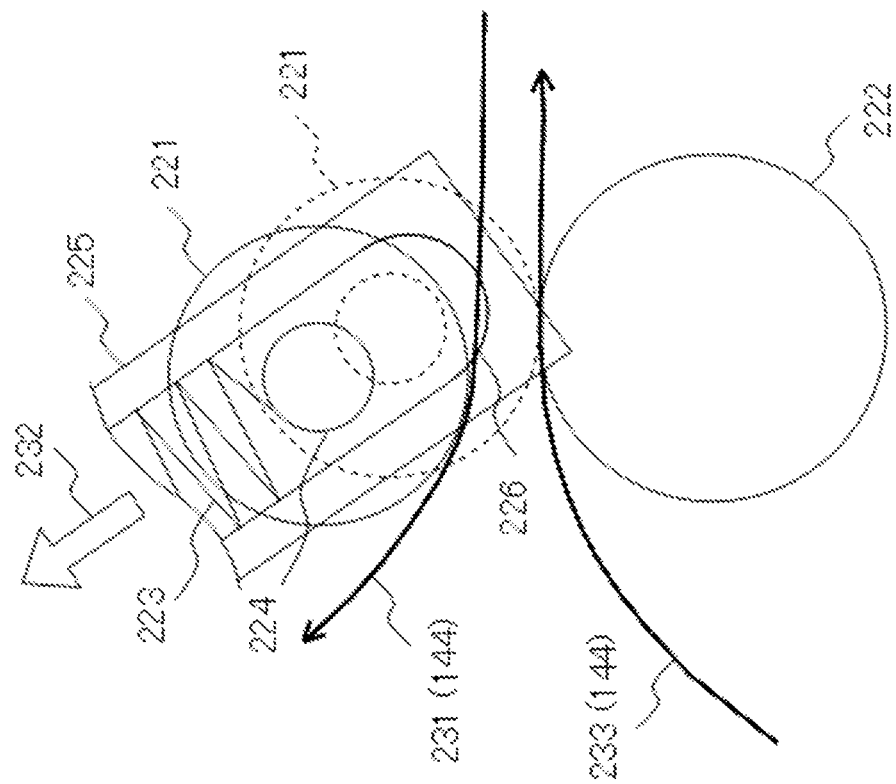
FIG. 11 shows an example of operation of the pair of discharge/reverse rollers, at the time of conveying the document, in the duplex document conveying apparatus according to the first exemplary embodiment of the present invention.

With reference to FIG. 11, description will be given for the operation of the pair of discharge/reverse rollers 221 and 222, when the document passes between them in the "twofold" state. In FIG. 11, the same reference numerals are given to the elements as those in FIG. 4, and their descriptions are properly omitted.

An arrow 231 indicates a direction of conveying the document 144, which is drawn to the inside of the duplex document conveying apparatus 200 from the discharge tray side in FIG. 10. A part of the document 144 indicated by the arrow 231 moves from right to upper left, contacting a surface of the discharge/reverse roller 221 illustrated with solid lines.

The trailing edge of the document 144 remains on the discharge tray side of the pair of discharge/reverse rollers 221 and 222. As described above, the part of the document between the pair of discharge/reverse rollers 221 and 222 and the pair of first conveying rollers 107 and 108 is conveyed in the strained state by the first conveying roller 107 and 108.

Accordingly, in the case that the document 144 has a part conveyed in a manner indicated by the arrow 231, the driven-side discharge/reverse roller 221 moves to a direction indicated by an arrow 232 in FIG. 11, that is, the direction of the second line segment 228 in FIG. 4. As a result, the driven-side discharge/reverse roller 221 separates from the driving-side discharge/reverse roller 222. This state continues until the trailing edge of the document 144 passes the pair of discharge/reverse rollers 221 and 222.

On the other hand, an arrow 233 indicates a direction of conveying the leading edge part of the document 144, which is discharged from the inside of the apparatus' main body to the discharge tray side in FIG. 10, where the leading edge part moves from lower left to a horizontal right direction, contacting an upper part of the discharge/reverse roller 222.

Being pushed out from behind by the pair of third conveying rollers 117 and 118, the leading edge of the document 144 moves to the detecting position of the document detection sensor 124 as shown in FIG. 10. Further, the leading edge of the document 144 passes between the pair of discharge/reverse rollers 221 and 222.

At that time, in the case that the document 144 is short in the conveying direction, and the trailing edge has already passed between the pair of discharge/reverse rollers 221 and 222, the two rollers pressingly contact each other. In this case, the pair of discharge/reverse rollers 221 and 222 rotates in directions to discharge the document 144 to the outside as shown in FIG. 5. Accordingly, at the nip area of the pair of discharge/reverse rollers 221 and 222, both surfaces of the leading edge part of the document 144 come into close contact with the rollers' surfaces and thus are subjected to the force to discharge the document in the direction to the discharge tray in this state.

On the other hand, in the state where the document 144 is long in the conveying direction, and passes in the "twofold" state as indicated by the two arrows 231 and 233 in FIG. 11, the driven-side discharge/reverse roller 221 separates from the driving-side discharge/reverse roller 222. In this state, while utilizing the conveying force by the pair of third conveying rollers 117 and 118, the driving-side discharge/reverse roller 222 causes the document 144 to move in a direction to the discharge tray, passing between the pair of discharge/reverse rollers 221 and 222, as indicated by the arrow 233.

Further, in the state where a part of the document, for which the image information on the second surface has been read, is being discharged, passing between the pair of discharge/reverse rollers 221 and 222, the leading edge of the document 144 indicated by the arrow 231 passes between the pair of discharge/reverse rollers 221 and 222. From this time, on the driven-side discharge/reverse roller 221, the force in the direction indicated by the arrow 232 is not exerted, but a force to pressingly contact the discharge/reverse roller 222 is exerted from the pressure spring 223. As a result, the document 144 indicated by the arrow 233 is discharged, up to its trailing edge, to the outside of the apparatus' main body, with no necessity of the conveying force from the pair of third conveying rollers 117 and 118. In this way, the reading of the image information on the second surface is completed.

As has been described above, according to the present invention, in duplex reading, even when the operation for discharging the document and the operation for drawing the document back in a direction opposite to the discharging direction are simultaneously performed for the same document, whole of the operation can be mechanically controlled by using a pair of rollers. Accordingly, downsizing and cost reduction of a duplex document conveying apparatus are possible.

According to the duplex document conveying apparatus according to the present exemplary embodiment, the mechanism for expanding a gap or reducing pressing force between the pair of discharge/reverse rollers 221 and 222 by means of controlling the pair of discharge/reverse rollers 221 and 222 from the outside becomes unnecessary. Accordingly, the cost of parts is reduced.

Further, an electrical component such as a solenoid and a driving circuit to drive it become unnecessary. Accordingly, the increase in temperature in the duplex document conveying apparatus 200 is suppressed, and thus safety measures for the apparatus can be reduced.

Moreover, according to the duplex document conveying apparatus of the present exemplary embodiment, as the number of implemented parts becomes small, the downsizing of the apparatus is facilitated.

Second Exemplary Embodiment

Figure 12:
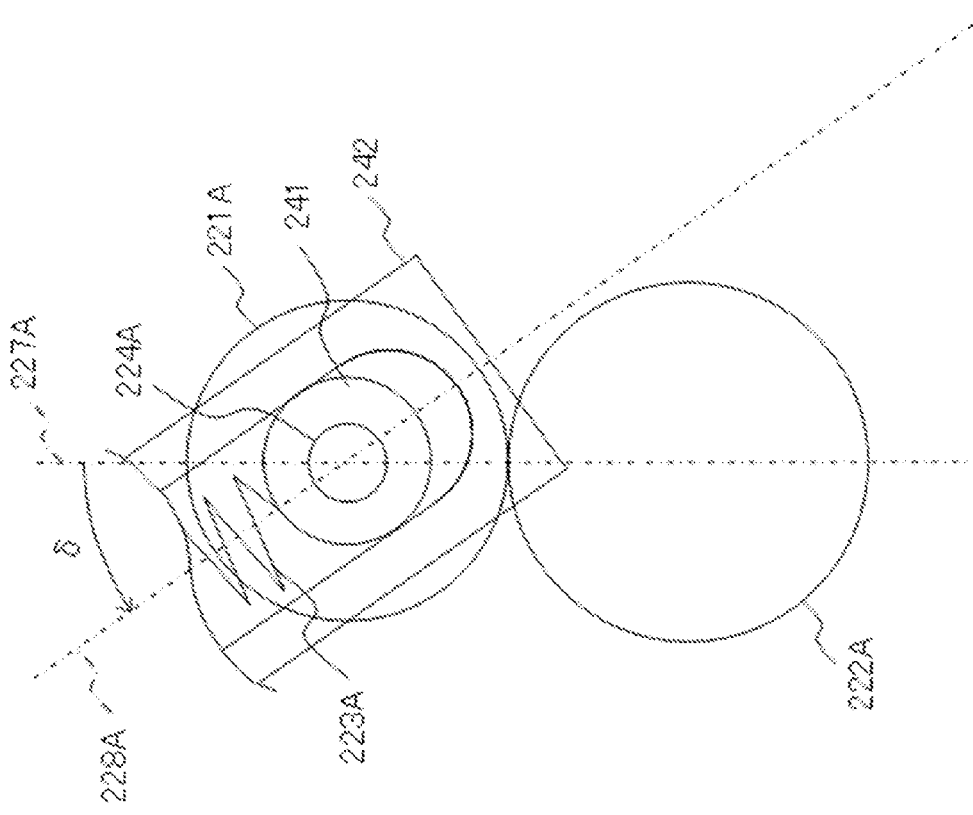
FIG. 12 shows an example of a configuration of a pair of discharge/reverse rollers in a duplex document conveying apparatus according to a second exemplary embodiment of the present invention.

With reference to FIG. 12, description will be given for a configuration of a duplex document conveying apparatus according to a second exemplary embodiment of the present invention. FIG. 12 schematically shows an example of a configuration of a pair of discharge/reverse rollers of the duplex document conveying apparatus.

The duplex document conveying apparatus according to the second exemplary embodiment is obtained by arranging a pair of discharge/reverse rollers 221A and 222A, shown in FIG. 12, in the duplex document conveying apparatus 200 according to the first exemplary embodiment, shown in FIG. 3, in place of the pair of discharge/reverse rollers 221 and 222. Other components in the configuration are the same as those in the configuration according to the first exemplary embodiment, therefore their descriptions will be omitted.

In FIG. 12, the discharge/reverse roller 221A arranged on the upper side is a driven-side roller, and the discharge/reverse roller 222A on the lower side, which pressingly contacts the former, is a driving-side roller. A rotary shaft 224A of the discharge/reverse roller 221A is fitted into a circular hole in a bearing 241.

In FIG. 12, a line segment crossing a center axis of each roller of the pair of discharge/reverse rollers 221A and 222A is defined as a first line segment 227A. The bearing 241 is fixed, movably in a direction indicated by a second line segment 228A, to a rail member 242 whose upper end part is fixed to an immovable member (not illustrated). The bearing 241 is pressed downward along the direction indicated by the second line segment 228A by a pressure spring 223A arranged above it.

In the second exemplary embodiment, an angle θ formed by the first line segment 227A and the second line segment 228A is determined, similarly to the angle θ formed by the first line segment 227 and the second line segment 228 in FIG. 4 with respect to the first exemplary embodiment, such that the second line segment 228A is acute-angled with respect to the direction toward a position in FIG. 3 where the pair of conveying rollers 107 and 108 is located. Accordingly, also in the second exemplary embodiment, when the document 144 passes between the pair of discharge/reverse rollers 221A and 222A in the "twofold" state, the driven-side discharge/reverse roller 221A operates similarly to that in the first exemplary embodiment.

The tensile force in the conveying direction exerted on the document 144 is decomposed into a component in the direction of the line segment 228A and a component in the direction perpendicular to the line segment 228A. That is, the force is exerted in a direction opposite to the direction of the pressing force from the pressure spring 223A to the rotary shaft 224A of the driven-side discharge/reverse roller 221A, and is exerted in a direction perpendicular to a rail of the rail member 242. The rotary shaft 224A performs a sliding motion in the direction of the line segment 228A, while the force in the direction perpendicular to the rail being subjected. According to the second exemplary embodiment, since the rotary shaft 224A slides while supported by the bearing 241, the movement operation for the rotary shaft 224A is stable, and thus a lifetime of the apparatus becomes longer.

In the first and the second exemplary embodiments described above, the driven-side discharge/reverse roller 221 (221A) is arranged on the upper side of the pair of discharge/reverse rollers 221 and 222 (221A and 222A), but the arrangement is not limited to this. Depending on the configuration of the components in the apparatus, the driving-side discharge/reverse roller 222 (222A) may be arranged on the upper side.

Further, depending on the direction of the document discharged to the outside of the apparatus, the rollers, arranged in the vertical direction in the above-described exemplary embodiments, may be arranged in another direction, such as in the horizontal direction.

Furthermore, three pairs of conveying rollers are arranged in the first and the second exemplary embodiments, but the number of conveying rollers is not limited to this. The number of conveying rollers may be changed appropriately according to a design of the duplex document conveying apparatus.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A document conveying apparatus comprising:
a reading unit, which reads image information on a surface of a sheet-like document; a driving-side discharge unit, which conveys a document in a first direction, first image information on a first surface of the document having been read by said reading unit, in contact with said first surface of said document, and discharges at least a part of said document from said document conveying apparatus;
a driven-side discharge unit, which is arranged so as to face said driving-side discharge unit, and receives transmission of a rotative force from said driving-side discharge unit, when being in contact with said driving-side discharge unit;
a specific-direction conveying unit, which conveys the document conveyed from said driving-side discharge unit in a second direction, which is opposite to said first direction, so that said reading unit reads second image information on a second surface of the document, wherein:
  said specific-direction conveying unit includes a pair of conveying rollers, and
  said fourth direction and a direction from a position of contact, between said driving roller and said driven roller, toward a position of contact, between said pair of conveying rollers, form an acute angle;
a pressing force applying unit, which applies a force in a third direction to said driven-side discharge unit so that said driven-side discharge unit is in contact with said driving-side discharge unit; wherein:
  said driving-side discharge unit includes a driving roller,
  said driven-side discharge unit includes a driven roller, and
  said movement control unit moves a rotary shaft of said driven roller in said third direction and in said fourth direction;
a movement control unit, which moves said driven-side discharge unit in a fourth direction, which is opposite to said third direction, when said document conveyed by said specific-direction conveying unit is in contact with said driven-side discharge unit; and
a torque limiting unit, which detects a torque exerted on said driving-side discharge unit, and restricts the transmission of said rotative force, when said torque is equal to or larger than a predetermined value.

2. The document conveying apparatus according to claim 1, wherein
said driving-side discharge unit includes a driving roller, said driven-side discharge unit includes a driven roller, and said movement control unit moves a rotary shaft of said driven roller in said third direction and in said fourth direction.

3. The document conveying apparatus according to claim 2, wherein
said specific-direction conveying unit includes a pair of conveying rollers, and
said fourth direction and a direction from a position of contact, between said driving roller and said driven roller, toward a position of contact, between said pair of conveying rollers, form an acute angle.

4. The document conveying apparatus according to claim 3, wherein said pair of conveying rollers are in contact with each other at a position higher than a position of contact between said driving roller and said driven roller.

5. The document conveying apparatus according to claim 2, wherein said movement control unit includes:
  a bearing unit, which bears the rotary shaft of said driven roller; and
  a rail unit, on which said bearing unit slides in said third direction and in fourth direction.

6. The document conveying apparatus according to claim 2, wherein a surface of said driven roller includes a material with a friction coefficient which is larger than a friction coefficient of a material on a surface of said driving roller.

7. The document conveying apparatus according to claim 1, wherein when said driving-side discharge unit conveys said document in the second direction, said specific-direction conveying unit conveys the document faster than a speed, at which said driving-side discharge unit conveys the document.

8. A document conveying method for conveying a sheet-like document in a document conveying apparatus, the method comprising:
reading first image information on a first surface of said document;
conveying said document in a first direction, and discharging at least a part of said document from said document conveying apparatus by means of a driving roller and a driven roller;
detecting a trailing edge of said document conveyed in the first direction;
reversing a conveying direction of said document, and conveying said document in a second direction, which is opposite to said first direction, on a basis of said detecting the trailing edge;
applying a tensile force to said document in a document conveying direction;
moving said driven roller, which applies a pressing force in a third direction to said driving roller, in a fourth direction, which is opposite to the third direction, so that said pressing force is reduced;
reading second image information on a second surface of said document;
detecting torque exerted on said driving roller, when the tensile force is applied to said document in the document conveying direction; and
controlling a rotary shaft of said driving roller, so that said torque is equal to or lower than a predetermined value.

9. The document conveying method according to claim 8, wherein
the tensile force in said conveying direction is applied to said document by a pair of conveying rollers; and
said fourth direction and a direction from a position of contact, between said driving roller and said driven roller, toward a position of contact, between said pair of conveying rollers, form an acute angle.

10. The document conveying method according to claim 9, wherein said pair of conveying rollers are in contact with each other at a position higher than a position of contact between said driving roller and said driven roller.

11. The document conveying method according to claim 10, wherein when conveying said document in the second direction, said document is conveyed by said pair of conveying rollers faster than a speed, at which said driving roller conveys the document.

* * * * *

UNITED STATES PATENT AND TRADEMARK OFFICE
CERTIFICATE OF CORRECTION

| | | |
|---|---|---|
| PATENT NO. | : 8,740,216 B2 | Page 1 of 1 |
| APPLICATION NO. | : 13/534931 | |
| DATED | : June 3, 2014 | |
| INVENTOR(S) | : Naoto Ota et al. | |

It is certified that error appears in the above-identified patent and that said Letters Patent is hereby corrected as shown below:

In the Claims

Column 16, Line 58-59: In Claim 11, delete "claim 10," and insert -- claim 9, --

Signed and Sealed this
Twenty-first Day of October, 2014

Michelle K. Lee
*Deputy Director of the United States Patent and Trademark Office*